Figure 1:
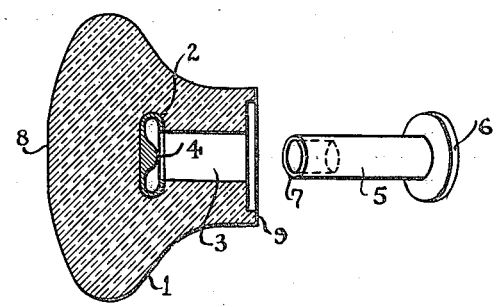

Feb. 5, 1924.

J. B. SANBORN 1,482,765

MOLDED ARTICLE

Filed April 20, 1922

INVENTOR.
John B. Sanborn
BY
ATTORNEY.

Patented Feb. 5, 1924.

1,482,765

UNITED STATES PATENT OFFICE.

JOHN B. SANBORN, OF EVANSTON, ILLINOIS, ASSIGNOR TO ASSOCIATED TRADING CORPORATION, OF MILWAUKEE, WISCONSIN, A CORPORATION OF WISCONSIN.

MOLDED ARTICLE.

Application filed April 20, 1922. Serial No. 555,705.

*To all whom it may concern:*

Be it known that I, JOHN B. SANBORN, a citizen of the United States, residing at Evanston, in the county of Cook and State of Illinois, have invented new and useful Improvements in Molded Articles, of which the following is a full, clear, concise, and exact description, reference being had to the accompanying drawing, forming a part of this specification.

This invention relates to molded articles to be attached to other articles or vice versa.

While not limited thereto the invention is particularly applicable to knobs for sheet metal covers of cooking utensils, etc.

There are many instances where it is desired to attach molded articles of the aforementioned and other types to sheet metal or other articles or vice versa without resorting to factory facilities and expedients but attachment of or to a molded article presents difficulties especially where permanent attachment is desired. As a result of such difficulties the employment of molded material has been restricted and resort has been made to insecure or otherwise unsatisfactory attaching means.

The present invention has among its objects to provide a molded article equipped with means whereby permanent attachment thereof or thereto may be accomplished in a facile and expeditious manner without special facilities and without skill.

Another object is to provide a molded article wherein the attaching means is concealed to preserve the continuity of the surface of the article except at the region of attachment.

Another object is to provide a molded article to receive a rivet the latter to be clenched therein under a driving force and to be supported and guided by the article during application of such driving force.

Another object is to provide a knob possessing the aforementioned features and so formed as to remain stable during the attaching operation.

Other objects and advantages of the invention will hereinafter appear and as will be apparent the invention is applicable to articles molded in various ways including articles cast in molds, etc.

The accompanying drawing illustrates an embodiment of the invention which will now be described it being understood that the invention is not limited to articles of the character illustrated.

Figure 2:
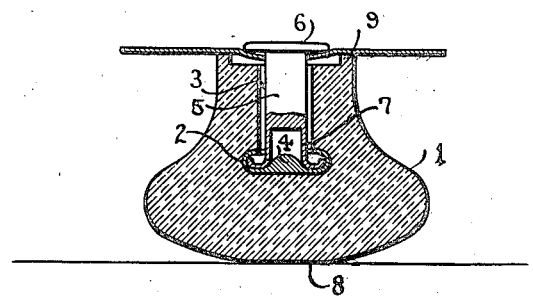

In the drawing,

Figure 1 is a sectional view of a knob together with a rivet therefor, said rivet being shown in perspective; and Fig. 2 is a sectional view of the knob shown in Fig. 1 after attachment thereof to a sheet metal part.

Referring to the drawing the knob 1 which preferably is formed of fire proof material has molded therein a rivet receiving and clenching cap 2. The knob is moreover molded with a passage 3 leading into the cap which preferably is located at the approximate center of mass of the knob. The knob is thus provided with a rivet receiving recess comprising a leading-in passage preferably of only slightly greater diameter than the rivet and an end chamber of greater diameter than the passage to accommodate the clenched extremity of the rivet.

The end chamber is preferably located as described for mechanical strength of the connection to be made between the knob and the rivet and for elongation of the leading-in passage whereby the walls of the passage serve to support and steady the rivet during driving thereof. The passage is also preferably of the same diameter as the opening in the cap whereby in molding the pin employed to form the passage may also be employed to plug the opening in the cap to prevent influx of the material of which the knob is formed.

The end of the molded-in cap forms in the end chamber an abutment against which the rivet may be driven for clenching thereof. As illustrated the cap is provided interiorly with a central projection 4 concentric with the passage 3 which projection when engaged by the rivet tends to spread the same for clenching thereof.

The rivet 5 illustrated has at one end a head 6 and at its opposite end a hollow section 7 open at its extremity. Thus assuming the rivet to be inserted in the cap with the projection 4 of the latter engaged in the open end of the hollow section of the rivet it will be apparent that a very slight driving force applied to the rivet will effect secure clenching of the latter within the knob.

To steady the knob during driving of the rivet the former is preferably provided with a flattened surface 8 to rest on a suitable support. Also the knob preferably is provided with an annular projection 9 concentric with the passage 3 and of an inside diameter slightly greater than the diameter of the rivet head.

Thus assuming the knob is to be attached to sheet metal cover or other sheet metal article having a degree of resiliency the rivet may be driven into the knob until the head of the rivet presses the sheet metal into the annular recess formed by the annular projection thereby minimizing the chance of loosening of the connection. Also this provision of the knob assuming the provision of a rivet of given length compensates for variations in thickness of the metal or other part to which the knob is to be attached.

As will be apparent attachment of the knob may be readily effected by resting the same on its flattened surface, then resting the cover or other article on the annular projection and passing the rivet through the cover into the knob and finally driving the rivet by light blows until clenched in the knob. The knob being stable and forming a support for the rivet through a considerable portion of its length enables employment of one hand to steady the cover and employment of the other hand to drive the rivet.

What I claim as new and desire to secure by Letters Patent is:

1. A molded article having therein a recess to receive an attaching member and an abutment within said recess against which the member may be driven to effect clenching of the latter for securement within said article.

2. A molded article having therein a recess to receive an attaching member and an abutment within said recess against which the member may be driven to effect clenching of the latter, said article being formed to provide said recess with an entrance passage of dimensions to guide and steady said member during driving thereof.

3. A molded article having an attaching member to be driven therein, a molded-in part to coact with said member to secure the latter to said article and an entrance passage for the attaching member of such dimensions as to guide and steady the latter during driving thereof.

4. A molded article having molded therein a rivet clenching cap and a leading-in passage of substantially the transverse dimensions of the receiving opening of said cap and of a longitudinal dimension to steady the rivet to be inserted in said cap.

5. A molded knob having therein a recess to receive an attaching member, an abutment within said recess against which the member may be driven to effect clenching of the latter and an exterior flattened surface perpendicular to the direction of the driving force of the attaching member and in line with said abutment.

6. A molded knob having therein a recess to receive an attaching member, an abutment within said recess against which the member may be driven to effect clenching of the latter for securement within said knob and exterior projecting portions to receive therebetween the head of the attaching member.

7. A molded knob having molded therein a rivet receiving and clenching cap at approximately its center of mass, and a leading-in passage of substantially the transverse dimensions of the opening in said cap and of a longitudinal dimension to guide and steady the rivet during clenching thereof.

8. A molded knob for attachment to a sheet metal article, said knob having an attaching rivet to clench under a driving force and a clenching cap for said rivet, the latter being molded in said knob and provided with a leading-pin passage molded in said knob, said passage being of transverse dimensions substantially the same as the dimensions of the receiving opening of said cap and of a longitudinal dimension to steady said rivet during driving thereof.

9. A molded knob having attaching means comprising a rivet to clench under a driving force and a clenching cap for said rivet, said knob having said cap molded therein and being formed with a rivet receiving passage leading to said cap and with a depression in its exterior surface to receive the head of said rivet whereby the material to which said knob is attached may be forced by said rivet into said depression.

In witness whereof, I have hereunto subscribed my name.

JOHN B. SANBORN.